(12) United States Patent
Homma et al.

(10) Patent No.: US 8,980,359 B2
(45) Date of Patent: Mar. 17, 2015

(54) OIL OR FAT COMPOSITION

(75) Inventors: Rika Homma, Chiba (JP); Kazuichi Tomonobu, Utsunomiya (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/988,170

(22) PCT Filed: Nov. 16, 2011

(86) PCT No.: PCT/JP2011/076355
§ 371 (c)(1),
(2), (4) Date: May 17, 2013

(87) PCT Pub. No.: WO2012/067132
PCT Pub. Date: May 24, 2012

(65) Prior Publication Data
US 2013/0230630 A1  Sep. 5, 2013

(30) Foreign Application Priority Data

Nov. 17, 2010 (JP) .................. 2010-256874

(51) Int. Cl.
*A23D 9/007* (2006.01)
*A23D 9/00* (2006.01)

(52) U.S. Cl.
CPC . *A23D 9/007* (2013.01); *A23D 9/00* (2013.01)
USPC ...................................... 426/601

(58) Field of Classification Search
None
See application file for complete search history.

(56) References Cited

U.S. PATENT DOCUMENTS

| | | | |
|---|---|---|---|
| 5,175,012 A * | 12/1992 | Shin et al. ................. | 426/542 |
| 6,277,431 B1 | 8/2001 | Berry et al. | |
| 6,743,450 B2 * | 6/2004 | Romanczyk et al. ......... | 424/769 |
| 2001/0046548 A1 | 11/2001 | Berry et al. | |
| 2002/0192318 A1 | 12/2002 | Berry et al. | |
| 2011/0177226 A1 * | 7/2011 | Nii et al. ................. | 426/601 |
| 2012/0259133 A1 | 10/2012 | Homma et al. | |
| 2013/0023684 A1 | 1/2013 | Moriwaki et al. | |

FOREIGN PATENT DOCUMENTS

| | | |
|---|---|---|
| CN | 85 1 01614 A | 8/1986 |
| CN | 1487794 A | 4/2004 |
| EP | 0 216 927 A1 | 4/1987 |
| JP | 58116415 * | 7/1983 |
| JP | 60-248611 | 12/1985 |
| JP | 4 78264 | 12/1992 |
| JP | 2001 197862 | 7/2001 |
| JP | 2001 224309 | 8/2001 |
| JP | 2004 519228 | 7/2004 |
| JP | 3597437 | 12/2004 |
| JP | 2006 257064 | 9/2006 |
| JP | 2006 325530 | 12/2006 |
| JP | 2007 138067 | 6/2007 |
| JP | 3997043 | 10/2007 |

OTHER PUBLICATIONS

Kitahara, M. et al. 1983. Fat Science, part A, Proc. 18th ISF Congress, Budapest. pp. 259-270.*
Farines, M. et al. 1988. Lipids 23(4)349-354.*
El-Saied et al. 1981. Z. Ernahrungswiss 20:145.*
Van Hoed, V. et al. 2006. JAOCS 83(4)315.*
Yoon, S. et al. 1994. JAOCS 71(2)227.*
U.S. Appl. No. 13/996,904, filed Jun. 21, 2013, Homma, et al.
Gui-hua Li, et al., "Study on the Functional Blend of Rice Bran Oil", Journal of Henan University of Technology, (Natural Science Edition), vol. 28, No. 4, Aug. 31, 2007, pp. 26-29 (with English Abstraact).
Fujita, M. et al., "Plant Sterol" Arteriosclerosis, vol. 13, No. 2, pp. 273-279, (Jun. 1985) (with English translation).
International Search Report issued Feb. 14, 2012 in PCT/JP11/076355 filed Nov. 16, 2011.
U.S. Appl. No. 14/240,214, filed Feb. 21, 2014, Homma, et al.
U.S. Appl. No. 14/347,888, filed Mar. 27, 2014, Homma, et al.
U.S. Appl. No. 14/347,915, filed Mar. 27, 2014, Homma, et al.
U.S. Appl. No. 14/240,295, filed Feb. 21, 2014, Homma, et al.
U.S. Appl. No. 14/240,206, filed Feb. 21, 2014, Homma, et al.
U.S. Appl. No. 14/240,248, filed Feb. 21, 2014, Homma, et al.
U.S. Appl. No. 14/240,209, filed Feb. 21, 2014, Homma, et al.

* cited by examiner

*Primary Examiner* — Carolyn Paden
(74) *Attorney, Agent, or Firm* — Oblon, McClelland, Maier & Neustadt, L.L.P.

(57) ABSTRACT

A fat or oil composition comprising from 0.02 to 0.65 mass % of a free type triterpene alcohol and 0.18 mass % or less of a γ-oryzanol.

17 Claims, No Drawings

OIL OR FAT COMPOSITION

CROSS REFERENCES TO RELATED APPLICATIONS

This application is a 371 of International Patent Application No. PCT/JP11/076,355, filed on Nov. 16, 2011, and claims priority to Japanese Patent Application No. 2010-256874, filed on Nov. 17, 2010.

FIELD OF THE INVENTION

The present invention relates to a fat or oil composition useful for cooking.

BACKGROUND OF THE INVENTION

Conventionally, a liquid fat or oil such as corn oil, rapeseed oil, soybean oil, cottonseed oil, rice oil, safflower oil, sunflower oil, high-oleic safflower oil, high-oleic sunflower oil, sesame oil, and olive oil has been mainly used as a fat or oil for cooking of tempura and fry.

The fats or oils are easily used and inexpensive, but have problems such as the occurrence of degraded oil odor caused by heating, and the bad appearance of batter (dispersibility of the batter), oily feeling, and bad texture of a deep-fried food obtained by using the fats or oils in deep-fry cooking.

Meanwhile, a triterpene alcohol is a tetracyclic compound having 30 or 31 carbon atoms and is a component widely distributed in plants such as rice bran, wheat, sesame, soybean, cocoa, coconut, corn seeds, olive seeds, and aloe. Further, the triterpene alcohol is a main component of an alcohol part constituting γ-oryzanol. A variety of reports have been made on physiological functions of the triterpene alcohol and the like, and the triterpene alcohol is known to have a blood cholesterol-reducing effect and a lipid absorption-suppressing effect (for example, Non Patent Document 1 and Patent Document 1).

Based on recent health trends, an attempt to impart the physiological functions of the triterpene alcohol and the like to edible oils has been made, and there have been reported, for example, an edible fat or oil which includes oryzanol, a free type or fatty acid ester type phytosterol, and a free type or fatty acid ester type triterpene alcohol and has a blood lipid-improving function (Patent Document 2), and an edible oil which includes a tocopherol, a tocotrienol, a free type sterol, a sterol ester, a cycloartenol, and a saturated fat and can reduce the synthesis, absorption, and blood level of cholesterol and increase excretion of cholesterol (Patent Document 3), and the like.

CITATION LIST

Patent Document

[Patent Document 1]: JP-A-2006-257064
[Patent Document 2]: JP-A-2001-224309
[Patent Document 3]: JP-A-2004-519228

Non Patent Document

[Non Patent Document 1]: Arteriosclerosis Vol. 13, No. 2 June (1985) 273-278

SUMMARY OF THE INVENTION

The present invention provides an fat or oil composition comprising from 0.02 to 0.65 mass % of a free type triterpene alcohol and 0.18 mass % or less of a γ-oryzanol.

SUMMARY OF THE INVENTION

It was found that, when the above-mentioned fat or oil containing the triterpene alcohol is used in deep-fry cooking, the deep-fried food may have oily and heavy flavor or have a hard batter and unpleasant texture.

Meanwhile, until now, many studies have been made on a technology for solving a variety of problems in such conventional fat or oil for cooking as described above. However, the fact is that sufficient improvement of the texture and flavor of a cooked food has not been achieved.

Therefore, the present invention provides a fat or oil composition which can be used in cooking such as deep-fry cooking and can improve a property of a cooked food, such as the texture and flavor.

The inventors of the present invention made intensive studies to search a fat or oil for cooking, which can impart an excellent property. As a result, they found that the texture of a cooked food can be improved by adding a specific amount of the free type triterpene alcohol to a conventional fat or oil. For example, the inventors found that, when the fat or oil is used in deep-fry cooking, it does not make the batter hard and results in a good texture. Further, when a fat or oil containing the free type triterpene alcohol and a γ-oryzanol, which is a ferulic acid ester of triterpene alcohol or the like in predetermined amounts is used in deep-fry cooking, it makes the batter sticky. In the meantime, the inventors found that the stickiness of the batter of the deep-fried food can be suppressed to improve the texture by adjusting the content of γ-oryzanol to a level equal to or lower than a predetermined value. Further, the inventors found that the oily feeling can be eliminated to improve the flavor by adjusting the content of the γ-oryzanol in the fat or oil composition to a level equal to or lower than a predetermined value.

In addition, surprisingly, the inventors found that the bitterness specific to a material can be suppressed by cooking using such fat or oil composition.

DETAILED DESCRIPTION OF THE INVENTION

When the fat or oil composition of the present invention is used in cooking, in particular, deep-fry cooking, it is possible to improve the texture of the batter of a deep-fried food and to reduce the bitterness of a material, which may be avoided by consumers, resulting in a delicious deep-fried food having excellent texture and flavor.

The triterpene alcohol used in the present invention is a tetracyclic triterpene alcohol having 30 or 31 carbon atoms. The triterpene alcohol is a compound clearly different from a 4-desmethylsterol having 28 or 29 carbon atoms, such as β-sitosterol, stigmasterol, or campesterol.

The triterpene alcohol may be obtained by, for example, extraction from rice (rice bran), rice oil (rice bran oil), or a fat or oil containing the triterpene alcohol other than rice oil, or a fat or oil-processed product, or by hydrolysis of the γ-oryzanol. Further, a commercially available product may be used, and examples of the product include Oryza Triterpenoid-P (Oryza Oil & Fat Chemical Co., Ltd.).

The triterpene alcohols are classified into a free type triterpene alcohol and a fatty acid ester type triterpene alcohol. The term "free type" type refers to a triterpene alcohol having a hydroxyl group at C-3 position of a steroid nucleus, and the term "fatty acid ester type" refers to a triterpene alcohol having a fatty acid which is ester bonded to the hydroxyl group at C-3 position of the free type triterpene alcohol. Examples of the free type triterpene alcohol include cycloartenol, 24-methylenecycloartanol, cyclobranol, cycloartanol, cyclosadol, cyclolaudenol, butyrospermol, parkeol, and the like. The free type triterpene alcohols may each be used as a single compound, or may be used as a mixture. Of those, from the standpoints of physiological effects, one or two or more selected from cycloartenol, 24-methylenecycloartanol, and cyclobranol are preferred, and cycloartenol, 24-methylenecycloartanol, or a combination thereof is more preferred.

The fat or oil composition of the present invention contains from 0.02 to 0.65 mass % (hereinafter, simply referred to as "%") of the free type triterpene alcohol. When the content of the free type triterpene alcohol is adjusted to 0.02% or more, the bitterness of a material such as a vegetable, which may be avoided by consumers, can be reduced. The content of the free type triterpene alcohol is preferably 0.05% or more, more preferably 0.1% or more, more preferably 0.13% or more, more preferably 0.2% or more, more preferably 0.27% or more, and even more preferably 0.4% or more, from the standpoint of reducing the bitterness. On the other hand, when the content of the free type triterpene alcohol is adjusted to 0.65% or less, crunchy texture or crispy texture can be achieved. Therefore, the content of the free type triterpene alcohol is preferably 0.6% or less, more preferably 0.53% or less, more preferably 0.4% or less, and even more preferably 0.27% or less, from the standpoint of improving the texture of batter of a deep-fried food.

In addition, the content of the free type triterpene alcohol in the fat or oil composition is preferably from 0.05 to 0.65%, more preferably from 0.1 to 0.6%, and even more preferably from 0.13 to 0.53%, from the standpoints of reducing the bitterness and improving the texture of batter of a deep-fried food.

The content of cycloartenol in the free type triterpene alcohol is preferably from 15 to 100%, more preferably from 20 to 90%, and even more preferably from 25 to 80%, from the standpoints of reducing the bitterness and improving the texture of batter of a deep-fried food.

The content of cycloartenol in the fat or oil composition is preferably from 0.003 to 0.65%, more preferably from 0.004 to 0.6%, more preferably from 0.005 to 0.55%, more preferably from 0.01 to 0.53%, and even more preferably from 0.02 to 0.5%, from the same standpoints.

Further, the content of 24-methylenecycloartanol in the free type triterpene alcohol is preferably from 5 to 85%, more preferably from 10 to 80%, and even more preferably from 20 to 75%, from the standpoint of industrial production.

The content of 24-methylenecycloartanol in the fat or oil composition is preferably from 0.001% to 0.55%, more preferably from 0.002% to 0.51%, and even more preferably from 0.004 to 0.48%, from the same standpoint.

In addition, the term "γ-oryzanol" used in the present invention is a collective term for a ferulic acid (3-methoxy-4-hydroxycinnamic acid) ester of a plant-derived sterol, and the γ-oryzanol is a substance present in rice oil, corn oil, or another cereal bran oil and coexists with the free type triterpene alcohol. Here, examples of the plant-derived sterol include the triterpene alcohols and plant-derived sterols other than the triterpene alcohols, such as α-sitosterol, β-sitosterol, stigmasterol, campesterol, α-sitostanol, β-sitostanol, stigmastanol, campestanol, brassicasterol, fucosterol, isofucosterol, spinasterol, and avenasterol. The γ-oryzanols may each be used as a single compound, or may be used as a mixture.

It is preferable to contain one or two or more selected from cycloartenyl ferulic acid ester, 24-methylenecycloartanyl ferulic acid ester, cyclobranyl ferulic acid ester, cyclosadol ferulic acid ester, β-sitosterol ferulic acid ester, stigmasterol ferulic acid ester, and campesterol ferulic acid ester as the γ-oryzanol.

In the present invention, the content of the γ-oryzanol in the fat or oil composition is 0.18% or less. When the content of the γ-oryzanol is adjusted to 0.18% or less, a food cooked using the fat or oil composition can have less oily feeling and light taste and flavor. Further, when the composition is used as a deep fry oil, the stickiness of the batter can be suppressed. The content of the γ-oryzanol in the fat or oil composition is preferably 0.15% or less, more preferably 0.1% or less, more preferably 0.05% or less, and even more preferably 0.01% or less from the standpoints of less oily feeling and suppressed stickiness of the batter. The content of the γ-oryzanol in the fat or oil composition is preferably 0.0002% or more, more preferably 0.001% or more, and even more preferably 0.002% or more, from the viewpoint of production.

Further, the content of the γ-oryzanol in the fat or oil composition is preferably from 0.0002 to 0.15%, more preferably from 0.0002 to 0.1%, more preferably from 0.001 to 0.1%, and even more preferably from 0.001 to 0.05%, from the standpoints of improving the taste and flavor, suppressing a vanillic odor, and suppressing the stickiness of the batter, and from the viewpoint of production.

No particular limitation is imposed on an edible fat or oil that may be used in the fat or oil composition of the present invention, and examples thereof may include the following fat or oil: a plant-derived fat or oil such as soybean oil, rapeseed oil, safflower oil, rice oil, corn oil, sunflower oil, cotton seed oil, olive oil, sesame oil, peanut oil, Job's tears seed oil, wheat germ oil, Japanese basil oil, linseed oil, perilla oil, sacha inchi oil, walnut oil, kiwi seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao fat, sal fat, shea fat, and algae oil; an animal-derived fat or oil such as fish oil, lard, beef tallow, and butter fat; or a transesterified oil, a hydrogenated oil, and a fractionated oil thereof.

These fats or oils may be used singly or may be mixed appropriately before use. Of those, from the standpoint of usability, a plant-derived fat or oil is preferably used, and a liquid fat or oil excellent in low-temperature resistance is more preferably used. The liquid fat or oil means a fat or oil that stays liquid at 20° C., when determined in accordance with a cold test defined in Standard Methods for the Analysis of Fats, Oils and Related Materials 2.3.8-27. In addition, the edible fat or oil is preferably a refined fat or oil obtained by a refinement step. No limitation is imposed on the composition of fatty acids in the fat or oil. It is preferable to contain a functional fatty acid such as a highly-unsaturated fatty acid such as linoleic acid, α-linolenic acid, γ-linolenic acid, stearidonic acid, EPA, or DHA.

The content of the fat or oil in the fat or oil composition of the present invention is preferably from 95 to 99.95% and more preferably from 97 to 99%, from the standpoint of usability.

The fat or oil composition of the present invention contains any one or more kinds of a monoacylglycerol, a diacylglycerol, and a triacylglycerol, and the content of the diacylglycerol in the fat or oil composition is preferably 9% or less, more preferably from 0.1 to 7%, and even more preferably from 0.2 to 5%, from the standpoint of industrial productivity of the fat or oil. Further, the content of the monoacylglycerol is preferably 3% or less and more preferably from 0 to 2%, from the standpoint of improving the taste and flavor. The content of the triacylglycerol is preferably from 88 to 99.8%, more preferably from 90 to 99.5%, and even more preferably from 92 to 99%, from the standpoint of the industrial productivity of the fat or oil.

In addition, the content of the free type fatty acid (salt) in the fat or oil composition in the present invention is preferably 5% or less, more preferably from 0 to 2%, and even more preferably from 0 to 1%, from the standpoints of the taste and flavor and the industrial productivity of the fat or oil.

No limitation is imposed on the constituent fatty acids of the fat or oil in the fat or oil composition of the present invention, and it may include a saturated fatty acid or an unsaturated fatty acid. A ratio of the unsaturated fatty acid is preferably from 60 to 100%, more preferably from 70 to 100%, even more preferably from 75 to 100%, and even more preferably from 80 to 98%, from the standpoints of the appearance and the industrial productivity of the fat or oil. The carbon number of the unsaturated fatty acid is preferably from 14 to 24 and more preferably from 16 to 22, from the standpoints of physiological effects.

In addition, the content of the saturated fatty acid relative to the constituent fatty acids of the fat or oil in the fat or oil composition is preferably 40% or less, more preferably from 0 to 30%, more preferably from 0 to 25%, and even more preferably from 2 to 20%, from the standpoints of the appearance, the physiological effects, and the industrial productivity of the fat or oil. The carbon number of the saturated fatty acid is preferably from 14 to 24 and more preferably from 16 to 22.

In addition, the content of an antioxidant in the fat or oil composition of the present invention is preferably from 0.01 to 2%, more preferably from 0.01 to 1%, and even more preferably from 0.01 to 0.5%, from the standpoint of oxidative stability during preservation and cooking. The antioxidant includes preferably one or two or more selected from, for example, a natural antioxidant, tocopherol, ascorbyl palmitate, ascorbyl stearate, dibutylhydroxytoluene (BHT), and butylhydroxyanisol (BHA), and more preferably one or two or more selected from a natural antioxidant, tocopherol, and ascorbyl palmitate. Of those, ascorbyl palmitate and tocopherol are preferably used in combination.

The fat or oil composition of the present invention can be used in the same manner as a general edible fat or oil, and can be applied to a wide range of foods and beverages including the fat or oil. In particular, the fat or oil composition of the present invention is used preferably as a fat or oil for cooking, and more preferably as a fat or oil for cooking of, for example, a deep-fried food such as fry or tempura, a sauteed food, or a grilled food.

Furthermore, as demonstrated in Examples below, the free type triterpene alcohol is considered to have a suppressing effect on a bitterness of vegetable because the bitterness of vegetable was suppressed by adding the free type triterpene alcohol to the fat or oil composition. Therefore, the free type triterpene alcohol is useful as a suppressor for the bitterness of vegetable and can be used for suppressing the bitterness of vegetable. Examples of the vegetable having the bitterness include solanaceous vegetables such as bell peppers and shishito peppers.

Preferred embodiments of the present invention are as described below.

<1> A fat or oil composition comprising from 0.02 to 0.65% of a free type triterpene alcohol and 0.18% or less of a γ-oryzanol.

<2> The fat or oil composition according to the aforementioned <1>, in which the content of the free type triterpene alcohol is preferably 0.05% or more, more preferably 0.1% or more, more preferably 0.13% or more, more preferably 0.2% or more, more preferably 0.27% or more, and even more preferably 0.4% or more.

<3> The fat or oil composition according to the aforementioned <1> or <2>, in which the content of the free type triterpene alcohol is preferably 0.6% or less, more preferably 0.53% or less, more preferably 0.4% or less, and even more preferably 0.27% or less.

<4> The fat or oil composition according to the aforementioned <1>, in which the content of the free type triterpene alcohol is preferably from 0.05 to 0.65%, more preferably from 0.1 to 0.6%, and even more preferably from 0.13 to 0.53%.

<5> The fat or oil composition according to any one of the aforementioned <1> to <4>, in which the free type triterpene alcohol is one or two or more selected from cycloartenol, 24-methylenecycloartanol, cyclobranol, cycloartanol, cyclosadol, cyclolaudenol, butyrospermol, and parkeol, preferably one or two or more selected from cycloartenol, 24-methylenecycloartanol, and cyclobranol, and more preferably cycloartenol, 24-methylenecycloartanol, or a combination thereof.

<6> The fat or oil composition according to the aforementioned <5>, in which the content of cycloartenol in the free type triterpene alcohol is from 15 to 100%, preferably from 20 to 90%, and more preferably from 25 to 80%.

<7> The fat or oil composition according to the aforementioned <5>, in which the content of cycloartenol in the fat or oil composition is from 0.003 to 0.65%, preferably from 0.004 to 0.6%, more preferably from 0.005 to 0.55%, more preferably from 0.01 to 0.53%, and even more preferably from 0.02 to 0.5%.

<8> The fat or oil composition according to any one of the aforementioned <5> to <7>, in which the content of 24-methylenecycloartanol in the free type triterpene alcohol is from 5 to 85%, preferably from 10 to 80%, and more preferably from 20 to 75%.

<9> The fat or oil composition according to any one of the aforementioned <5> to <7>, in which the content of 24-methylenecycloartanol in the fat or oil composition is from 0.001% to 0.55%, preferably from 0.002% to 0.51%, and more preferably from 0.004 to 0.48%.

<10> The fat or oil composition according to any one of the aforementioned <1> to <9>, in which the content of the γ-oryzanol in the fat or oil composition is preferably 0.15% or less, more preferably 0.1% or less, more preferably 0.05% or less, and even more preferably 0.01% or less.

<11> The fat or oil composition according to any one of the aforementioned <1> to <10>, in which the content of the γ-oryzanol in the fat or oil composition is 0.0002% or more, preferably 0.001% or more, and more preferably 0.002% or more.

<12> The fat or oil composition according to any one of the aforementioned <1> to <9>, in which the content of the γ-oryzanol in the fat or oil composition is preferably from 0.0002 to 0.15%, more preferably from 0.0002 to 0.1%, more preferably from 0.001 to 0.1%, and even more preferably from 0.001 to 0.05%.

<13> The fat or oil composition according to any one of the aforementioned <1> to <12>, comprising from 95 to 99.95%, and preferably from 97 to 99% of an fat or oil.

<14> The fat or oil composition according to any one of the aforementioned <1> to <13 >, in which the content of a triacylglycerol in the fat or oil composition is from 88 to 99.8%, preferably from 90 to 99.5%, and even more preferably from 92 to 99%.

<15> The fat or oil composition according to any one of the aforementioned <1> to <14>, in which from 60 to 100%, preferably from 70 to 100%, more preferably from 75 to 100%, and even more preferably from 80 to 98% of the constituent fatty acids of the fat or oil are unsaturated fatty acids.

<16> The fat or oil composition according to any one of the aforementioned <1> to <15>, further comprising from 0.01 to 2%, preferably from 0.01 to 1%, and more preferably from 0.01 to 0.5% of an antioxidant.

<17> The fat or oil composition according to the aforementioned <16>, in which the antioxidant is one or two or more selected from a natural antioxidant, tocopherol, ascorbyl palmitate, ascorbyl stearate, dibutylhydroxytoluene, and butylhydroxyanisol, preferably one or two or more selected from a natural antioxidant, tocopherol, and ascorbyl palmitate, and more preferably a combination of tocopherol and ascorbyl palmitate.

<18> Use of the fat or oil composition according to any one of the aforementioned <1> to <17> as an edible fat or oil.

<19> The use according to the aforementioned <18> as a fat or oil for cooking.

<20> The use according to the aforementioned <19> as a fat or oil for cooking of a deep-fried food, a sauteed food, or a grilled food.

<21> Use of a free type triterpene alcohol for suppressing a bitterness of vegetable.

<22> The use according to the aforementioned <21>, in which the free type triterpene alcohol is one or two or more selected from cycloartenol, 24-methylenecycloartanol, cyclobranol, cycloartanol, cyclosadol, cyclolaudenol, butyrospermol, and parkeol, preferably one or two or more selected from cycloartenol, 24-methylenecycloartanol, and cyclobranol, and more preferably cycloartenol, 24-methylenecycloartanol, or a combination thereof.

<23> The use according to the aforementioned <22>, in which the content of cycloartenol in the free type triterpene alcohol is from 15 to 100%, preferably from 20 to 90%, and more preferably from 25 to 80%.

<24> The use according to the aforementioned <22> or <23>, in which the content of 24-methylenecycloartanol in the free type triterpene alcohol is from 5 to 85%, preferably from 10 to 80%, and more preferably from 20 to 75%.

EXAMPLES

Analysis Method (i) Composition of Glycerides in Fat or Oil

About 10 mg of a fat or oil sample and 0.5 mL of a trimethylsilylating agent ("Silylating agent TH," manufactured by Kanto Kagaku) were placed in a glass sample bottle, and the bottle was sealed and heated at 70° C. for 15 minutes. 1.0 mL of water and 1.5 mL of hexane were added thereto, and the bottle was shaken. The bottle was allowed to stand still, and then the upper layer was analyzed by gas-liquid chromatography (GLC).

<GLC analysis conditions>
Column: DB-1ht, 10.0 m×0.25 mm×0.10 μm (Agilent)
Injector: 340° C., split ratio: 50:1
Detector: 350° C. (FID)
Carrier gas: helium, 1 mL/min
Oven temperature: 80° C.→(10° C./min)→340° C. (kept for 20 minutes)

(ii) Composition of Constituent Fatty Acids in Fat or Oil

Fatty acid methyl esters were prepared in accordance with "Preparation method for fatty acid methyl ester (2.4.1.-1996)" described in "Standard Method For the Analysis of Fats, Oils and Related Materials" edited by Japan Oil Chemists' Society, and the resultant samples were subjected to measurement according to American Oil Chemists. Society Official Method Ce 1f-96 (GLC method).

<GLC analysis conditions>
Column: CP-SIL88, 100 m×0.25 mm×0.2 μm (VARIAN)
Injector: 250° C., split ratio: 200:1
Detector: 250° C. (FID)
Carrier gas: helium, 1 mL/min
Oven temperature: 174° C. (kept for 50 minutes)→(5° C./min)→220° C. (kept for 25 minutes)

(iii) Total Triterpene Alcohols

About 5 g of a fat or oil sample and about 20 mL of a 2 N potassium hydroxide/ethanol solution were added to a conical flask, and the mixture was heated at 80° C. for 60 minutes. The mixture was left standing to cool to room temperature, and then an internal standard (cholesterol), 15 mL of water, and 10 mL of hexane were added thereto, followed by shaking. The mixture was allowed to stand still, and then the upper layer was separated and concentrated. 0.5 mL of the trimethylsilylating agent ("Silylating agent TH," manufactured by Kanto Kagaku) was added to the concentrate, and the flask was sealed and heated at 70° C. for 30 minutes. 1.0 mL of water and 1.5 mL of hexane were added thereto, and the flask was shaken. The flask was allowed to stand still, and then the total amount of triterpene alcohols (mass %) was measured by analyzing the upper layer by gas-liquid chromatography (GLC).

<GLC analysis conditions>
Column: DB-1ht, 10.0 m×0.25 mm×0.10 μm (Agilent)
Injector: 340° C., split ratio: 80:1
Detector: 350° C. (FID)
Carrier gas: helium, 1 mL/min
Oven temperature: 200° C.→(10° C./min)→340° C. (kept for 10 minutes)

(iv) Free Type Triterpene Alcohol

About 500 mg of a fat or oil sample were dissolved in about 5 mL of hexane, and the solution was charged in an SPE cartridge (Sep-Pak Silica, 5 g, GL Sciences Inc.). The cartridge was washed with about 40 mL of hexane/ether (volume ratio 95/5), and then elution was carried out with about 40 mL of ethanol/ether/hexane (volume ratio 50/25/25), followed by separation of an ethanol/ether/hexane elution fraction. The solvent in the resultant fraction was distilled off, and the residue was charged in PTLC (Si60, 20×20×0.1 cm, Merck & Co., Inc.). Development was carried out successively with hexane/ether/acetic acid (volume ratio 90/10/2) and chloroform/ether (volume ratio 95/5), and then a free type triterpene alcohol part was separated. The separated free type triterpene alcohol fraction and 0.5 mL of a trimethylsilylating agent ("Silylating agent TH," manufactured by Kanto Kagaku) were added to a bottle, and the bottle was sealed and heated at 70° C. for 30 minutes. 1.0 mL of water and 1.5 mL of hexane were added thereto, and the mixture was shaken. The mixture was allowed to stand still, and then the amount of free type triterpene alcohols (mass %) was measured by analyzing the upper layer by gas-liquid chromatography (GLC). The GLC analysis was carried out under the same conditions as those in (iii).

(v) γ-Oryzanol

About 100 mg of a fat or oil sample were dissolved in ethyl acetate to adjust a volume thereof to 10 mL, and analyzed by an HPLC method.

<HPLC Analysis Conditions>

Column: Inertsil ODS-3, 4.6 mm×250 mm, 5 μm (GL Sciences Inc.)

Column temperature: 40° C.

Flow rate: 1.2 mL/min

Detection: UV 325 nm

Eluent: acetonitrile/butanol/acetic acid (volume ratio: 82/3/2)

(vi) Fatty Acid Ester Type Triterpene Alcohol

The amount of the free type triterpene alcohol and the amount of the γ-oryzanol converted into a free type were subtracted from the total amount of triterpene alcohols. Thus, the amount of a fatty acid ester type triterpene alcohol converted into a free type was calculated. The amount of the free type triterpene alcohol was converted into the amount of fatty acid ester type triterpene alcohol, thereby determining the amount of the fatty acid ester type triterpene alcohol (mass %). It should be noted that the conversion of the free type into the fatty acid ester type was carried out by calculation on the assumption that the linked fatty acid was oleic acid.

(vii) 4-Desmethylsterol

In the same manner as in (iv) Free type triterpene alcohol, a 4-desmethylsterol part was separated from the fat or oil sample, and was analyzed by gas-liquid chromatography (GLC).

Examples 1 to 15 and Comparative Examples 1 to 7

Preparation of Fat or Oil Composition

A commercially available γ-oryzanol (manufactured by Wako Pure Chemical Industries, Ltd., purity: 99%) was used as γ-oryzanol.

A commercially available triterpene alcohol preparation ("ORYZA TRITERPENOID P" from Oryza Oil & Fat Chemical Co., Ltd., triterpene alcohol: 59%) was used as a triterpene alcohol. The component composition of this product is as follows: campesterol: 21%, β-sitosterol: 15%, stigmasterol: 3%, cycloartenol: 22%, and 24-methylenecycloartanol: 37%.

A commercially available plant-derived sterol preparation ("Phytosterol S" from Tama Biochemical Co., Ltd.," phytosterol: 97%) was used as a plant-derived sterol (4-desmethylsterol). The component composition of this product is as follows: brassicasterol: 5%, campesterol: 25%, stigmasterol: 21%, and β-sitosterol: 46%. It should be noted that the content of a fatty acid ester type triterpene alcohol and the content of a γ-oryzanol in the ORYZA TRITERPENOID P and the Phytosterol S were 0%, respectively.

γ-Oryzanol, free type triterpene alcohol, and 4-desmethylsterol were blended in refined rapeseed oil (manufactured by The Nisshin Oillio Group, Ltd.) at ratios shown in Table 2, and the respective components were dissolved by mixing until the mixtures turned entirely clear using a stirrer while the temperature was kept at 50° C. Thus, fat or oil compositions were prepared.

It should be noted that the composition of glycerides and composition of fatty acids in the refined rapeseed oil were as shown in Table 1. In addition, the content of the free type triterpene alcohol, the content of the fatty acid ester type triterpene alcohol, and the content of the γ-oryzanol in the refined rapeseed oil were 0%, respectively.

TABLE 1

|  | Refined rapeseed oil |
|---|---|
| Composition of glyceride (mass %) |  |
| MAG | 0.0 |
| DAG | 0.9 |
| TAG | 99.1 |
| Fatty acid | 0.0 |
| Composition of fatty acid (mass %) |  |
| C14:0 | 0.0 |
| C16:0 | 4.3 |
| C16:1 | 0.2 |
| C18:0 | 2.0 |
| C18:1 | 60.5 |
| C18:2 | 21.0 |
| C18:3 | 10.8 |
| C20:0 | 0.6 |
| C20:1 | 0.4 |
| C22:0 | 0.0 |
| C24:0 | 0.1 |

MAG: Monoacylglycerol
DAG: Diacylglycerol
TAG: Triacylglycerol (Evaluation for Tempura Cooking)

Tempura cooking was performed with each of the fat or oil compositions by the following method.

Oil amount: 600 g (wok)

Oil temperature: 180° C., heating with a gas stove burner (medium heat)

Materials to be Fried:

| Prawn (black tiger prawns) | 8 prawns |
|---|---|
| Lotus root (slices) | 8 slices |
| Pumpkin (slices) | 8 slices |
| Bell peppers (each cut into halves) | 8 peppers |
| Shishito peppers (whole) | 8 peppers |
| f. viridis (Makino) Makino (whole) | 8 pieces |
| Eggplants (each cut into halves) | 8 eggplants |

Batter:

| Flour | 100 g |
|---|---|
| Egg | 50 g |
| Water | 150 g |

Nine panelists evaluated the taste and flavor and texture of deep-fried foods in accordance with the following evaluation standards, and an average value of scores was calculated as a score of the tempura. It should be noted that cooked bell pepper and shishito pepper were evaluated for bitterness.

Table 2 shows the results.

(Bitterness)

5: Having no bitterness

4: Having much reduced bitterness

3: Having reduced bitterness

2: Having slightly reduced bitterness

1: Having bitterness (Texture)

5: The batter has an appropriate hardness, no stickiness, and crispy texture and is delicious.

4: The batter is slightly hard but has no stickiness.

3: The batter is rather hard or has slight stickiness.

2: The batter is hard or has stickiness.

1: The batter is very hard or has strong stickiness.

(Oily Feeling)
5: Having no oily feeling and light texture
4: Having slightly oily feeling but light texture
3: Having rather oily feeling and rather heavy texture
2: Having oily feeling and slightly heavy texture
1: Having very oily feeling and heavy texture

TABLE 2

|   |   | Example 1 | Example 2 | Example 3 | Example 4 | Example 5 | Example 6 | Example 7 | Example 8 |
|---|---|---|---|---|---|---|---|---|---|
| Blend | Free type triterpene alcohol (mass %) | 0.02 | 0.13 | 0.27 | 0.40 | 0.65 | 0.02 | 0.13 | 0.53 |
|  | γ-oryzanol (mass %) | 0.0002 | 0.0011 | 0.0022 | 0.0034 | 0.0055 | 0.05 | 0.05 | 0.05 |
| Evaluation | 1) Bitterness | 3 | 4 | 4 | 4 | 5 | 3 | 4 | 5 |
|  | 2) Texture | 5 | 5 | 4 | 4 | 3 | 5 | 5 | 4 |
|  | 3) Oily feeling | 5 | 5 | 5 | 5 | 5 | 4 | 4 | 4 |

|   |   | Example 9 | Example 10 | Example 11 | Example 12 | Example 13 | Example 14 | Example 15 |
|---|---|---|---|---|---|---|---|---|
| Blend | Free type triterpene alcohol (mass %) | 0.13 | 0.53 | 0.65 | 0.13 | 0.27 | 0.40 | 0.53 |
|  | γ-oryzanol (mass %) | 0.10 | 0.10 | 0.10 | 0.15 | 0.15 | 0.15 | 0.15 |
| Evaluation | 1) Bitterness | 3 | 4 | 4 | 3 | 3 | 3 | 4 |
|  | 2) Texture | 5 | 4 | 3 | 3 | 3 | 3 | 3 |
|  | 3) Oily feeling | 4 | 4 | 4 | 3 | 3 | 3 | 3 |

|   |   | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Blend | Free type triterpene alcohol (mass %) | 0 | 0.80 | 0.80 | 0.27 | 0.53 | 0 | 0.70 |
|  | γ-oryzanol (mass %) | 0 | 0.05 | 0.15 | 0.20 | 0.20 | 0.05 | 0.05 |
|  | 4-desmethylsterol (mass %) | 0 | 0 | 0 | 0 | 0 | 0.05 | 0 |
| Evaluation | 1) Bitterness | 1 | 5 | 5 | 3 | 4 | 1 | 5 |
|  | 2) Texture | 3 | 2 | 2 | 2 | 2 | 3 | 2 |
|  | 3) Oily feeling | 5 | 4 | 3 | 2 | 2 | 5 | 4 |

As is clear from the results shown in Table 2, the deep-fried foods obtained by cooking using the fat or oil compositions including the free type triterpene alcohol in specific amounts and the γ-oryzanol in specific amounts or lower were found to have good textures of the batter, less oily feeling, reduced bitterness specific to the materials to be fried, and good property in the taste and flavor and texture.

On the other hand, the deep-fried food obtained by using the refined rapeseed oil (Comparative Example 1) was found to have the original bitterness of the materials to be fried, and the deep-fried food obtained by using the fat or oil containing 4-desmethylsterol instead of the free type triterpene alcohol (Comparative Example 6) was also found to have the original bitterness of the material to be fried. In addition, the deep-fried foods obtained by using the fats or oils containing the free type triterpene alcohol in large amounts (Comparative Examples 2, 3, and 7) were found to have hard textures of the batter to deteriorate the textures, and the deep-fried foods obtained by using the fats or oils containing the γ-oryzanol in large amounts (Comparative Examples 4 and 5) were found to have strong sweet smell, more oily feeling, heavy taste and flavor, and sticky batter.

The invention claimed is:

1. A fat or oil composition, comprising:
  a fat or an oil; and
  from 0.02 to 0.65 mass % of a free type triterpene alcohol and from 0.0002 to 0.18 mass % of a γ-oryzanol,
  wherein the free type triterpene alcohol is at least one member selected from the group consisting of cycloartenol, 24-methylenecycloartanol, and cyclobranol, and
  wherein a content of cycloartenol in the free type triterpene alcohol is from 15 to 100 mass %.
2. The fat or oil composition according to claim 1, comprising from 0.1 to 0.6 mass % of the free type triterpene alcohol.
3. The fat or oil composition according to claim 1, comprising from 0.13 to 0.53 mass % of the free type triterpene alcohol.
4. The fat or oil composition according to claim 1, comprising from 0.0002 to 0.15 mass % of the γ-oryzanol.
5. The fat or oil composition according to claim 1, comprising from 0.0002 to 0.1 mass % of the γ-oryzanol.
6. The fat or oil composition according to claim 1, comprising from 0.001 to 0.1 mass % of the γ-oryzanol.
7. The fat or oil composition according to claim 1, comprising from 0.001 to 0.05 mass % of the γ-oryzanol.
8. The fat or oil composition according to claim 1, wherein a content of 24-methylenecycloartanol is from 0.001 to 0.55 mass %.
9. The fat or oil composition according to claim 1, wherein a content of the fat or oil is from 95 to 99.95 mass %.
10. The fat or oil composition according to claim 1, further comprising triacylglycerol, wherein a content of triacylglycerol is from 88 to 99.8 mass %.
11. The fat or oil composition according to claim 1, further comprising triacylglycerol, wherein a content of triacylglycerol is from 92 to 99 mass %.

12. The fat or oil composition according to claim 1, further comprising diacylglycerol, wherein a content of diacylglycerol is from 0.1 to 7 mass %.

13. The fat or oil composition according to claim 1, wherein from 60 to 100 mass % of constituent fatty acids of the fat or oil are unsaturated fatty acids.

14. The fat or oil composition according to claim 1, further comprising from 0.01 to 2 mass % of an antioxidant.

15. The fat or oil composition according to claim 1, which is an edible fat or oil composition.

16. A fat or oil composition, comprising:
a fat or an oil; and
from 0.05 to 0.65 mass % of a free type triterpene alcohol and from 0.0002 to 0.18 mass % of a γ-oryzanol,
wherein the free type triterpene alcohol is at least one member selected from the group consisting of cycloartenol, 24-methylenecycloartanol, and cyclobranol, and
wherein a content of cycloartenol in the free type triterpene alcohol is from 15 to 100 mass %.

17. A fat or oil composition, comprising:
a fat or an oil; and
from 0.02 to 0.65 mass % of a free type triterpene alcohol and from 0.0002 to 0.18 mass % of a γ-oryzanol,
wherein the free type triterpene alcohol is at least one member selected from the group consisting of cycloartenol, 24-methylenecycloartanol, and cyclobranol, and
wherein a content of cycloartenol is from 0.003 to 0.65 mass %.

* * * * *